(12) United States Patent
Bamford et al.

(10) Patent No.: US 8,704,782 B2
(45) Date of Patent: Apr. 22, 2014

(54) ELECTRONIC DEVICE, METHOD FOR VIEWING DESKTOP THEREOF, AND COMPUTER-READABLE MEDIUM

(75) Inventors: Drew Bamford, Bellevue, WA (US); David Brinda, Bellevue, WA (US)

(73) Assignee: HTC Corporation, Taoyuan County (TW)

( * ) Notice: Subject to any disclaimer, the term of this patent is extended or adjusted under 35 U.S.C. 154(b) by 489 days.

(21) Appl. No.: 12/788,321

(22) Filed: May 27, 2010

(65) Prior Publication Data
US 2010/0302188 A1 Dec. 2, 2010

(30) Foreign Application Priority Data
Jun. 2, 2009 (TW) .............................. 98118203 A

(51) Int. Cl.
G06F 3/041 (2006.01)
G06F 3/048 (2013.01)

(52) U.S. Cl.
USPC ............ 345/173; 715/833; 715/732; 715/764

(58) Field of Classification Search
USPC .................... 345/173–183; 715/833, 732, 764
See application file for complete search history.

(56) References Cited

U.S. PATENT DOCUMENTS

| | | | |
|---|---|---|---|
| 7,206,017 B1 * | 4/2007 | Suzuki ............................. | 348/36 |
| 2003/0080995 A1 * | 5/2003 | Tenenbaum et al. .......... | 345/738 |
| 2004/0125128 A1 * | 7/2004 | Chang et al. ................... | 345/730 |
| 2005/0091604 A1 * | 4/2005 | Davis ............................. | 715/772 |
| 2007/0132789 A1 * | 6/2007 | Ording et al. .................. | 345/684 |
| 2007/0157094 A1 * | 7/2007 | Lemay et al. .................. | 715/717 |
| 2007/0247436 A1 * | 10/2007 | Jacobsen ........................ | 345/173 |
| 2007/0288860 A1 * | 12/2007 | Ording et al. .................. | 715/779 |
| 2009/0100380 A1 * | 4/2009 | Gardner et al. ................ | 715/854 |
| 2009/0106687 A1 | 4/2009 | De Souza Sana et al. | |
| 2009/0207139 A1 * | 8/2009 | Kraft .............................. | 345/173 |
| 2010/0262911 A1 * | 10/2010 | Kaplan et al. ................. | 715/719 |

FOREIGN PATENT DOCUMENTS

CN 101192129 6/2008

OTHER PUBLICATIONS

"Second Office Action of European Counterpart Application", issued on Feb. 2, 2011, p. 1-p. 9, in which the listed reference was cited.
"First Office Action of China Counterpart Application", issued on Jun. 23, 2011 p. 1-p. 6, in which the listed reference was cited.
"European Search Report of Europe Counterpart Application," issued on Aug. 25, 2010, p. 1-p. 3, in which the listed references were cited.
"First Office Action of Europe Counterpart Applition," issued on Sep. 2, 2010, p. 1-p. 7, in which the listed references were cited.
"Third Office Action of Europe Counterpart Application", issued on Aug. 9, 2011, p. 1-p. 10, in which the listed references were cited.

* cited by examiner

*Primary Examiner* — Dorothy Harris
(74) *Attorney, Agent, or Firm* — Jianq Chyun IP Office

(57) ABSTRACT

An electronic device, a method for viewing a desktop thereof, and a computer-readable medium are provided. One of n continuous areas of the desktop and a navigation bar are displayed in a touch screen of the electronic device. The navigation bar includes an indicator and n indexes, wherein the n indexes are respectively corresponding to the n areas, and the indicator points to the index corresponding to the area currently displayed in the touch screen. When a sliding operation applied to the indicator is detected on the navigation bar, the desktop and the indicator are moved according to the sliding operation. When the sliding operation terminates, an index closest to the indicator is selected from the n indexes as a target index. Finally, the indicator is controlled to point to the target index, and a target area corresponding to the target index is displayed in the touch screen.

33 Claims, 11 Drawing Sheets

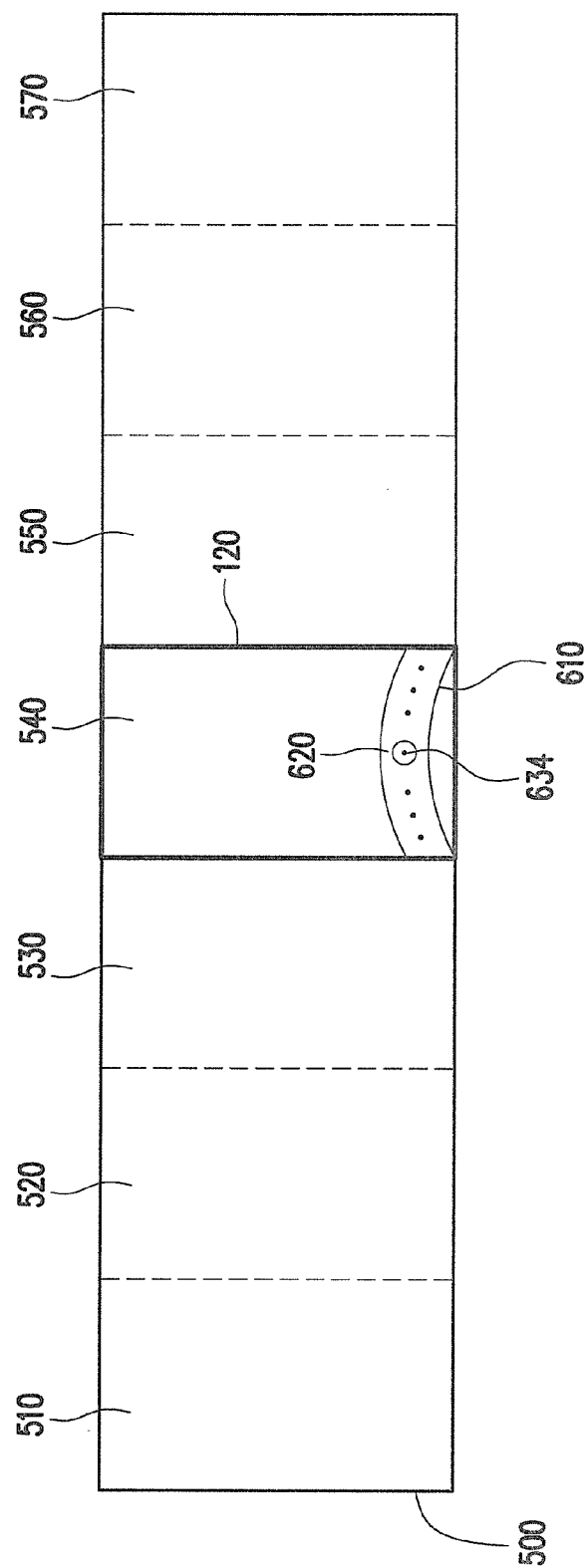

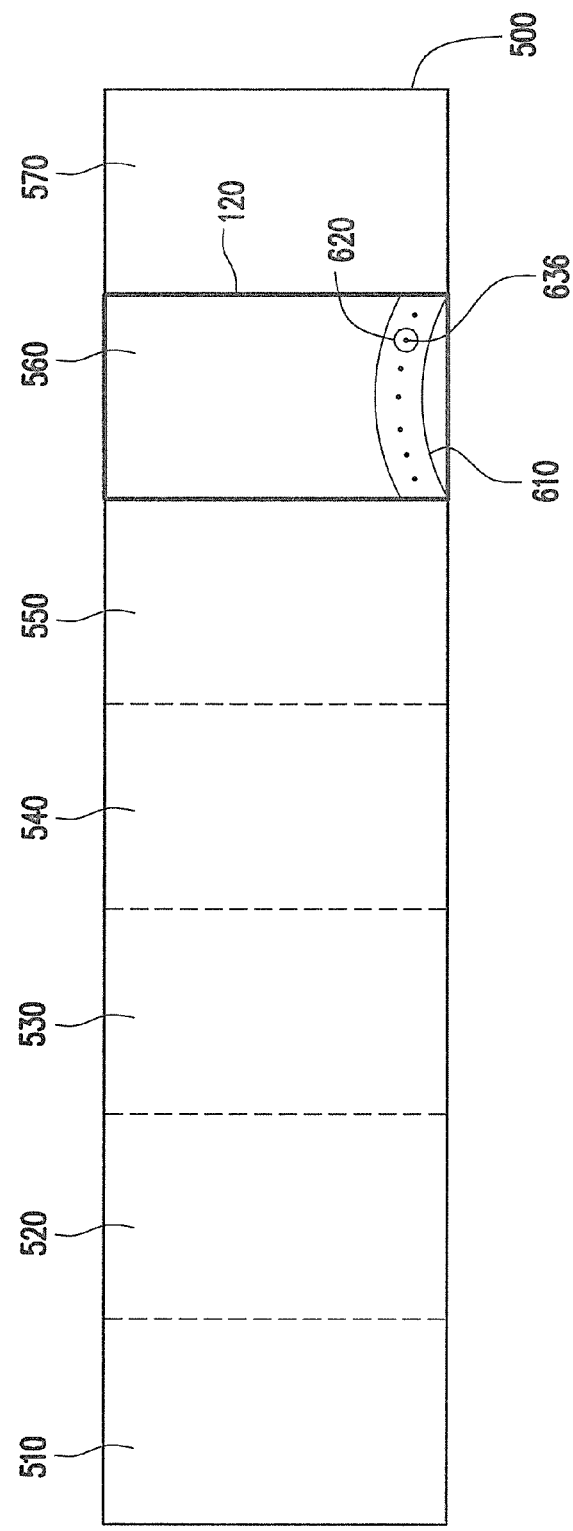

ELECTRONIC DEVICE, METHOD FOR
VIEWING DESKTOP THEREOF, AND
COMPUTER-READABLE MEDIUM

CROSS-REFERENCE TO RELATED
APPLICATION

This application claims the priority benefit of Taiwan application serial No. 98118203, filed on Jun. 2, 2009. The entirety of the above-mentioned patent application is hereby incorporated by reference herein and made a part of this specification.

BACKGROUND OF THE INVENTION

1. Field of the Invention

The present invention generally relates to a method for operating an electronic device, and more particularly, to a method for viewing a desktop of an electronic device and related applications.

2. Description of Related Art

Along with the rapid development of touch sensing techniques, touch screens have been applied into more and more electronic devices to replace the conventional liquid crystal display (LCD) screens, so as to be the input/output interfaces of these electronic devices. Thus, when a user uses an electronic device with a touch screen, besides viewing various operation images and reading the contents of different documents through the touch screen, the user can also click on the touch screen with his/her finger or a stylus to input text and instructions or open up files and application programs.

Generally speaking, touch sensing techniques can be categorized into single-touch techniques and multi-touch techniques. Regarding a touch screen supporting a single-touch technique, only one event triggered by the user is received during a single time period. Single-touch screens have been broadly applied to many electronic products thanks to their low production cost and high durability. Multi-touch screens are implemented with more complicated hardware/software techniques. However, because a multi-touch touch screen can detect multiple touch actions within a single time period, a user can operate the multi-touch screen with multiple fingers, so that the operation of the touch screen is made more enjoyable.

Regardless of whether an electronic device is disposed with a single-touch screen or a multi-touch screen, a user can conveniently operate the electronic device simply through the touch screen. Accordingly, how to develop more operation modes based on the characteristics of touch screen has become one of the major subjects when new electronic products are designed and developed.

SUMMARY OF THE INVENTION

Accordingly, the present invention is directed to a method for viewing a desktop, an electronic device and a computer-readable medium, for allowing a user to instantly view a desired area of the desktop so that the operation is made more convenient.

The present invention provides a method for viewing a desktop of an electronic device having a touch screen, wherein the desktop is divided into n (n is a positive integer greater than 1) continuous areas, and one of the n areas is displayed in the touch screen. In the present method, a navigation bar is displayed in the touch screen. The navigation bar includes an indicator and n indexes, wherein the n indexes are respectively corresponding to the n areas of the desktop, and the indicator points to the index corresponding to the area currently displayed in the touch screen. When a sliding operation applied to the indicator is detected on the navigation bar, the desktop and the indicator are moved according to the sliding operation. When the sliding operation terminates, an index closest to the indicator is selected from the n indexes as a target index, the indicator is controlled to point to the target index, and a target area corresponding to the target index is displayed in the touch screen.

The present invention provides an electronic device including a desktop module, a touch screen, and a processing module. The desktop module provides a desktop of the electronic device, wherein the desktop is divided into n (n is a positive integer greater than 1) continuous areas. The touch screen displays one of the n areas and a navigation bar. The navigation bar includes an indicator and n indexes, wherein the n indexes are respectively corresponding to the n areas of the desktop, and the indicator points to the index corresponding to the area currently displayed in the touch screen. The processing module is connected to the desktop module and the touch screen. When the touch screen detects a sliding operation applied to the indicator on the navigation bar, the processing module moves the desktop and the indicator according to the sliding operation. When the sliding operation terminates, the processing module selects an index closest to the indicator from the n indexes as a target index, controls the indicator to point to the target index, and displays a target area corresponding to the target index in the touch screen.

The present invention further provides a computer-readable medium including a plurality of program instructions, wherein the program instructions are to be loaded into an electronic device. The electronic device has a desktop divided into n (n is a positive integer greater than 1) continuous areas, and one of the n areas is displayed in a touch screen of the electronic device. The program instructions execute following operations after they are loaded into the electronic device. First, a navigation bar is displayed in the touch screen. The navigation bar includes an indicator and n indexes, wherein the n indexes are respectively corresponding to the n areas of the desktop, and the indicator points to the index corresponding to the area currently displayed in the touch screen. Next, when a sliding operation applied to the indicator is detected on the navigation bar, the desktop and the indicator are moved according to the sliding operation. When the sliding operation terminates, an index closest to the indicator is selected from the n indexes as a target index. Finally, the indicator is controlled to point to the target index, and a target area corresponding to the target index is displayed in the touch screen.

As described above, the navigation bar in the present invention allows a user to view various areas on a large desktop instantly and conveniently. Besides, the navigation bar in the present invention shows the user about the relative position between the area currently displayed in the touch screen and the other areas of the desktop, so that the user can instantly switch to any desired area by using this navigation bar. Thereby, the convenience in viewing a desktop of an electronic device is greatly improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 7A~7C are diagrams of a desktop viewing method according to an embodiment of the present invention.

DESCRIPTION OF THE EMBODIMENTS

Figure 1:
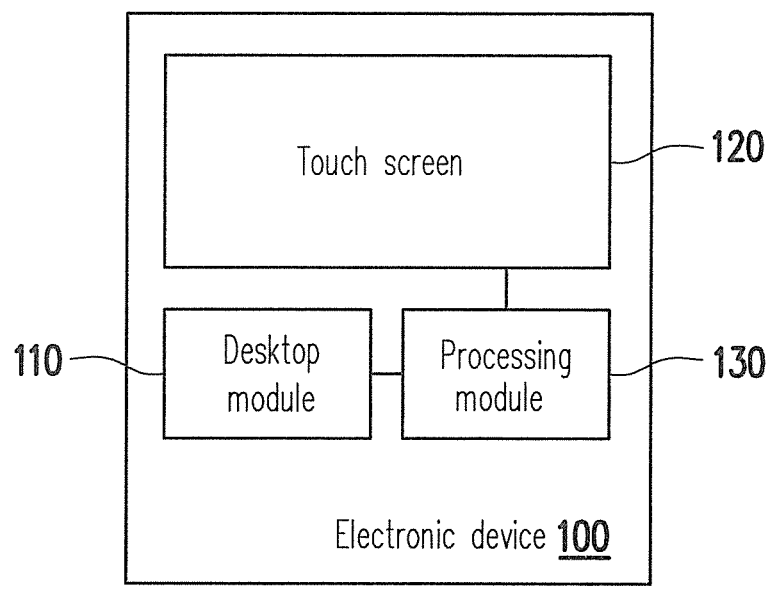
FIG. 1 is a block diagram of an electronic device.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an electronic device according to an embodiment of the present invention. In the present embodiment, the electronic device 100 includes a desktop module 110, a touch screen 120, and a processing module 130. The electronic device 100 may be a cell phone, a personal digital assistant (PDA), a PDA phone, or a smart phone. However, the type of the electronic device 100 is not limited herein.

Figure 2:
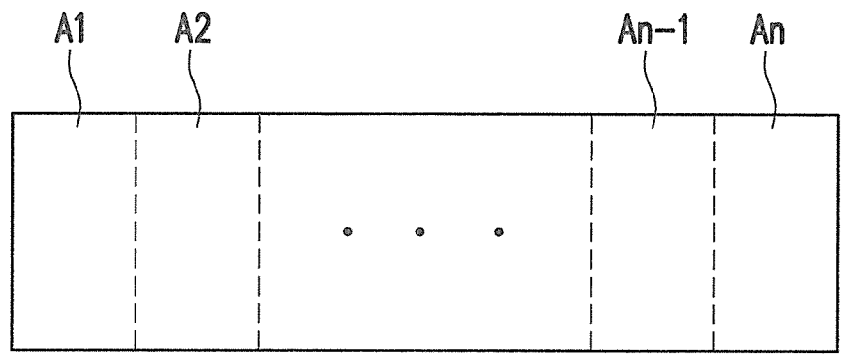
FIGS. 2, 3, and 5 are diagrams of a desktop according to an embodiment of the present invention.

The desktop module 110 provides a desktop of the electronic device 100. Icons of applications programs, general function links, or operation images of application programs may be displayed on the desktop of the electronic device 100. However, the content displayed on the desktop is not limited herein. The desktop module 110 divides the desktop into n continuous areas, wherein n is a positive integer greater than 1, and the size of each of the areas may tally with the size of the touch screen 120. In an embodiment illustrated in FIG. 2, the desktop module 110 equally divides the desktop 200 into n continuous areas (i.e., area A1, area A2, . . . , area An−1, and area An) horizontally. In another embodiment illustrated in FIG. 3, the desktop module 110 equally divides the desktop 300 into n continuous areas (i.e., area A'1, area A'2, . . . , area A'n−1, and area A'n) vertically.

The touch screen 120 may be a resistive touch screen or a capacitive touch screen and which is served as the input/output interface of the electronic device 100. Namely, a user may issue an instruction to the electronic device 100 and view the response of the electronic device 100 through the touch screen 120. In the present embodiment, the touch screen 120 displays one of foregoing n areas and a navigation bar. The navigation bar has an indicator and n indexes, wherein the n indexes are respectively corresponding to the n areas of the desktop, and the indicator points to the index corresponding to the area currently displayed in the touch screen 120. Thus, a user may determine the relative position between the area currently displayed in the touch screen 120 and the other areas through the navigation bar.

The processing module 130 may be any hardware and/or software with calculation and processing capabilities, and the implementation of the processing module 130 is not limited herein. When the touch screen 120 detects a sliding operation applied to the indicator on the navigation bar (for example, the user slides the indicator on the navigation bar), the processing module 130 moves the desktop and the indicator according to the sliding operation so that the user may control the electronic device 100 to instantly display any desired area of the desktop by using the navigation bar.

Figure 4:
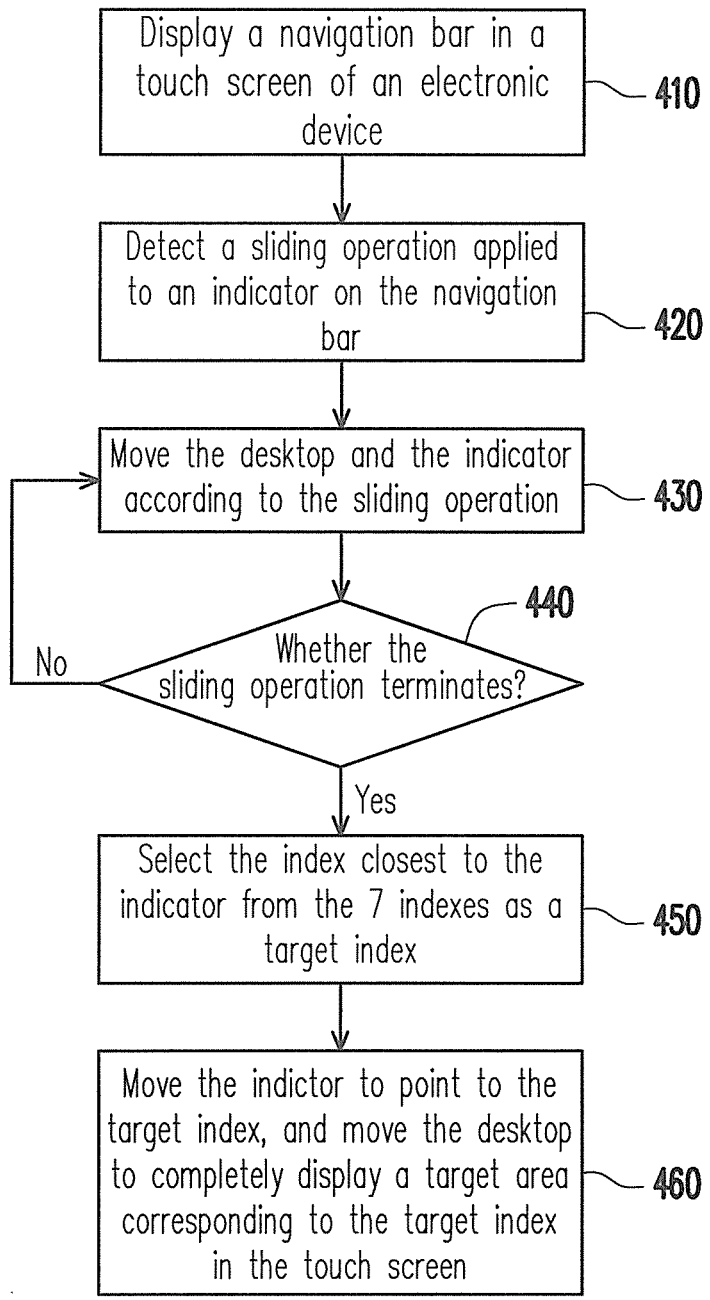
FIG. 4 is a flowchart of a desktop viewing method according to an embodiment of the present invention.

Below, another embodiment of the present invention will be described in order to explain the operation flow of the electronic device 100 in detail. FIG. 4 is a flowchart of a desktop viewing method according to an embodiment of the present invention. For the convenience of description, it is assumed that the desktop of the electronic device 100 is equally divided into 7 continuous areas and one of the 7 areas is displayed in the touch screen 120.

First, in step 410, the touch screen 120 displays a navigation bar. For example, referring to both FIG. 5 and FIG. 6, the desktop 500 of the electronic device 100 is equally divided into 7 continuous areas 510, 520, 530, 540, 550, 560, and 570 horizontally, wherein the area 540 is displayed in the touch screen 120. The touch screen 120 also displays a navigation bar 610. The navigation bar 610 is a horizontal scroll bar having an indicator 620 and 7 indexes 631, 632, 633, 634, 635, 636, and 637. The 7 indexes 631~637 of the navigation bar 610 are respectively corresponding to the 7 areas 510~570 of the desktop 500 and are horizontally arranged on the navigation bar 610 in an order of the corresponding areas on the desktop 500. The indicator 620 of the navigation bar 610 points to the index 634 corresponding to the area 540 currently displayed in the touch screen 120. However, it should be noted that the appearances of the navigation bar 610, the indicator 620, and the indexes 631~637 are only examples for describing the present embodiment but not for limiting the scope of the present invention.

Additionally, in the present embodiment, the navigation bar 610 is displayed at a horizontal edge (i.e., the lower edge) of the touch screen 120. However, the present invention is not limited thereto, and the navigation bar 610 may also be displayed at another horizontal edge (i.e., the upper edge) of the touch screen 120.

Next, in step 420, the touch screen 120 detects a sliding operation applied to the indicator 620 on the navigation bar 610. For example, the touch screen 120 detects the sliding operation performed by the user to the indicator 620 with his/her finger or a stylus on the navigation bar 610.

Thereafter, in step 430, the processing module 130 moves the desktop 500 and the indicator 620 according to the sliding operation. To be specific, the processing module 130 controls the desktop 500 to move toward a direction reverse to the direction of the sliding operation and controls the indicator 620 to move toward the direction of the sliding operation. For example, when the user slides the indicator 620 on the navigation bar 610 rightwards with his/her finger (or a stylus), the processing module 130 controls the desktop 500 to move leftwards and the indicator 620 to move rightwards. Contrarily, when the user slides the indicator 620 on the navigation bar 610 leftwards with his/her finger (or the stylus), the processing module 130 controls the desktop 500 to move rightwards and the indicator 620 to move leftwards.

After that, in step 440, the processing module 130 constantly detects whether the sliding operation on the touch screen 120 terminates. If the sliding operation has not terminated, step 430 is executed again, and the processing module 130 continues to move the desktop 500 and the indicator 620 according to the sliding operation. When the sliding operation terminates, in step 450, the processing module 130 selects an index closest to the indicator 620 from the indexes 631~637 as a target index.

Finally, in step 460, the processing module 130 moves the indicator 620 to point to the target index and moves the desktop 500 to completely display a target area corresponding to the target index in the touch screen 120.

Figure 7B:
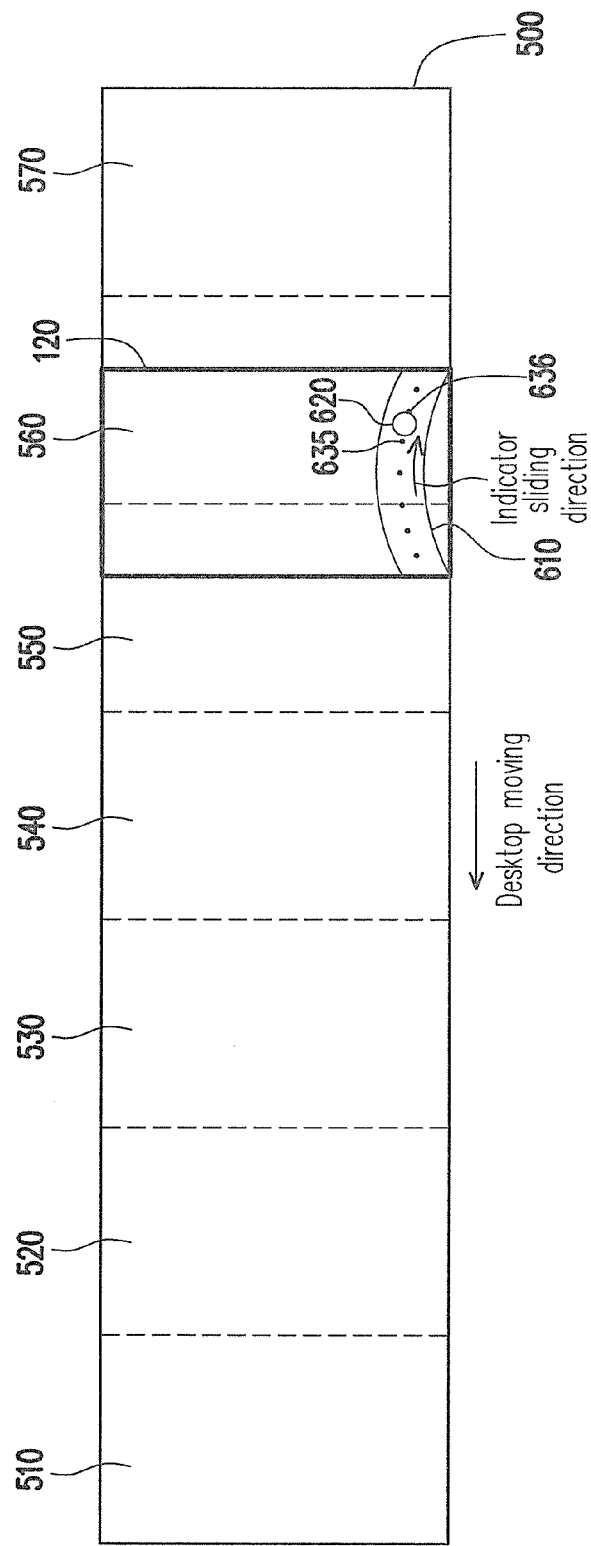

FIGS. 7A~7C illustrate the content displayed in the touch screen 120 according to an embodiment of the desktop viewing method in the present invention. As shown in FIG. 7A, before the user performs any operation, the touch screen 120 displays the area 540 of the desktop 500. Herein the indicator 620 of the navigation bar 610 points to the index 634 corresponding to the area 540. Thus, the user gets to know about the relative position between the area currently displayed in the touch screen 120 (i.e., the area 540) and the other areas of the desktop 500 according to the position of the indicator 620 on the navigation bar 610.

Next, as shown in FIG. 7B, when the user touches the indicator 620 on the navigation bar 610 with his/her finger (or a stylus) and slides rightwards, the indicator 620 is moved rightwards on the navigation bar 610 along the direction of the sliding operation, and the desktop 500 is moved leftwards. In the present embodiment, if the user keeps moving the indicator 620 rightwards, the touch screen 120 sequentially displays the areas 550, 560, and 570 of the desktop 500 located to the right of the area 540. Similarly, if the user touches the indicator 620 on the navigation bar 610 and slides leftwards, the touch screen 120 sequentially displays the areas 530, 520, and 510 of the desktop 500 to the left of the area 540. Thus, the user may slide the indicator 620 on the navigation bar 610 to view any area on the desktop 500 through the touch screen 120.

Finally, as shown in FIG. 7C, when the user stops sliding his/her finger (or the stylus), because the indicator 620 is closest to the index 636 on the navigation bar 610, the processing module 130 moves the indicator 620 to point to the index 636, and meanwhile, processing module 130 moves the desktop 500 to completely display the area 560 corresponding to the index 636 in the touch screen 120. Thus, the user may control the touch screen 120 to instantly display a desired area of the desktop by sliding the indicator 620 on the navigation bar 610 to the index corresponding to the desired area.

In another embodiment of the present invention, a directional element (not shown) is disposed on the surface of the electronic device 100, wherein the directional element may be a trackball or an optical sensor. The user may slide his/her finger on the directional element to generate a sliding operation. Similarly, after the directional element detects the sliding operation, the processing module 130 moves the desktop and the indicator on the navigation bar according to the sliding operation. Besides, when the sliding operation terminates, the processing module 130 displays the corresponding area of the desktop according to the current position of the indicator. The method for displaying the area of the desktop according to the sliding operation is the same as or similar to that described in foregoing embodiment therefore will not be described herein.

Figure 8:
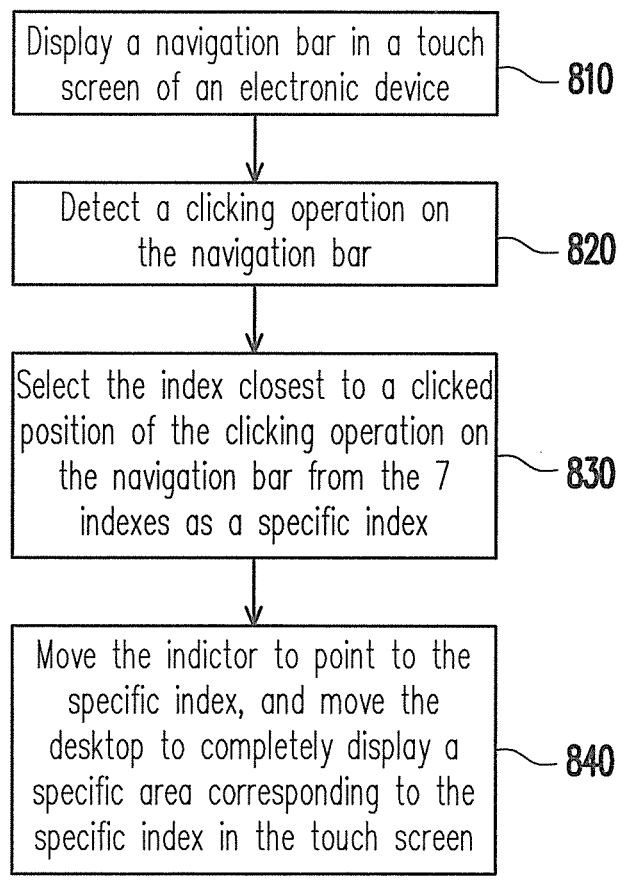
FIG. 8 is a diagram of a touch screen and content displayed therein according to another embodiment of the present invention.

It should be mentioned that in another embodiment of the present invention, the processing module 130 may also move the desktop and the indicator according to a clicking operation on the navigation bar detected by the touch screen 120. FIG. 8 is a flowchart of a desktop viewing method according to another embodiment of the present invention.

Figure 5:
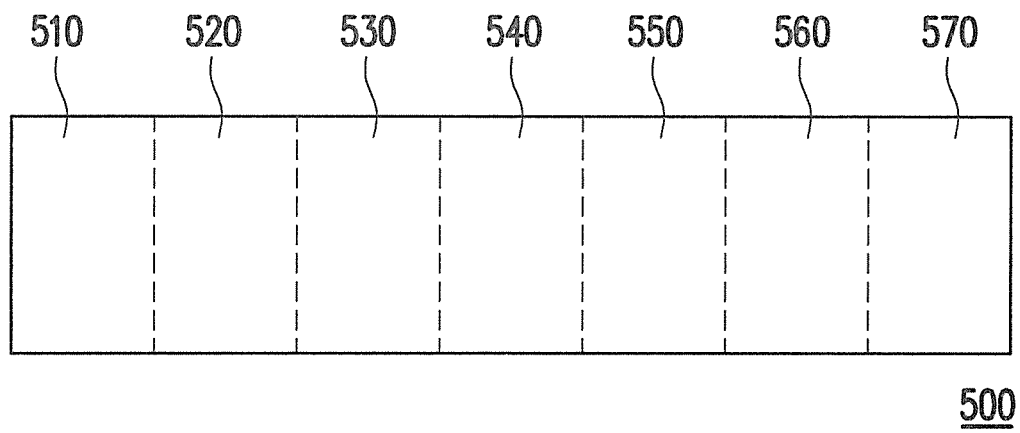
Figure 6:
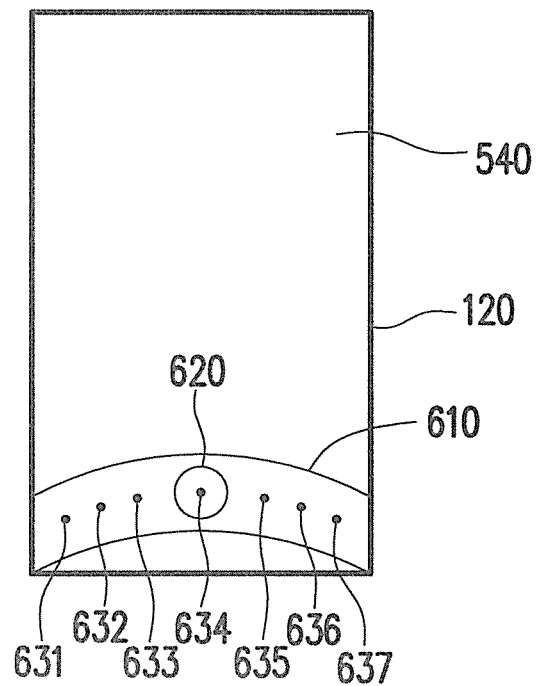
FIG. 6 is a diagram of a touch screen and content displayed therein according to an embodiment of the present invention.

Referring to FIG. 8, first, in step 810, the touch screen 120 displays a navigation bar. Referring to FIG. 5 and FIG. 6 again, the step 810 in the present embodiment is similar to the step 410 in foregoing embodiment therefore will not be described herein.

Then, in step 820, the touch screen 120 detects a clicking operation on the navigation bar 620. For example, the touch screen 120 detects a clicking operation performed by a user on the navigation bar 620 with his/her finger (or a stylus).

Next, in step 830, the processing module 130 selects the index closest to a clicked position of the clicking operation on the navigation bar 620 from the indexes 631~637 as a specific index.

Finally, in step 840, the processing module 130 moves the indicator 620 to point to the specific index and moves the desktop to completely display a specific area corresponding to the specific index in the touch screen 120.

Figure 9A:
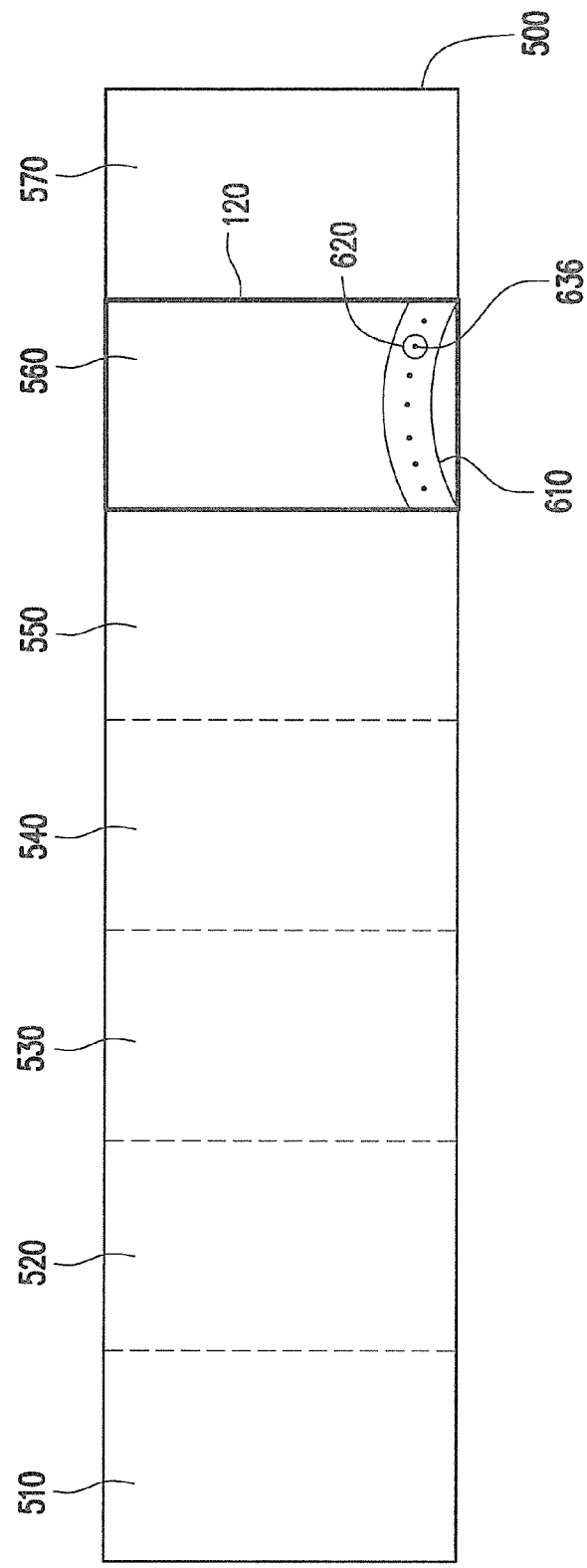
FIGS. 9A~9C are diagrams of a desktop viewing method according to another embodiment of the present invention.
Figure 9B:
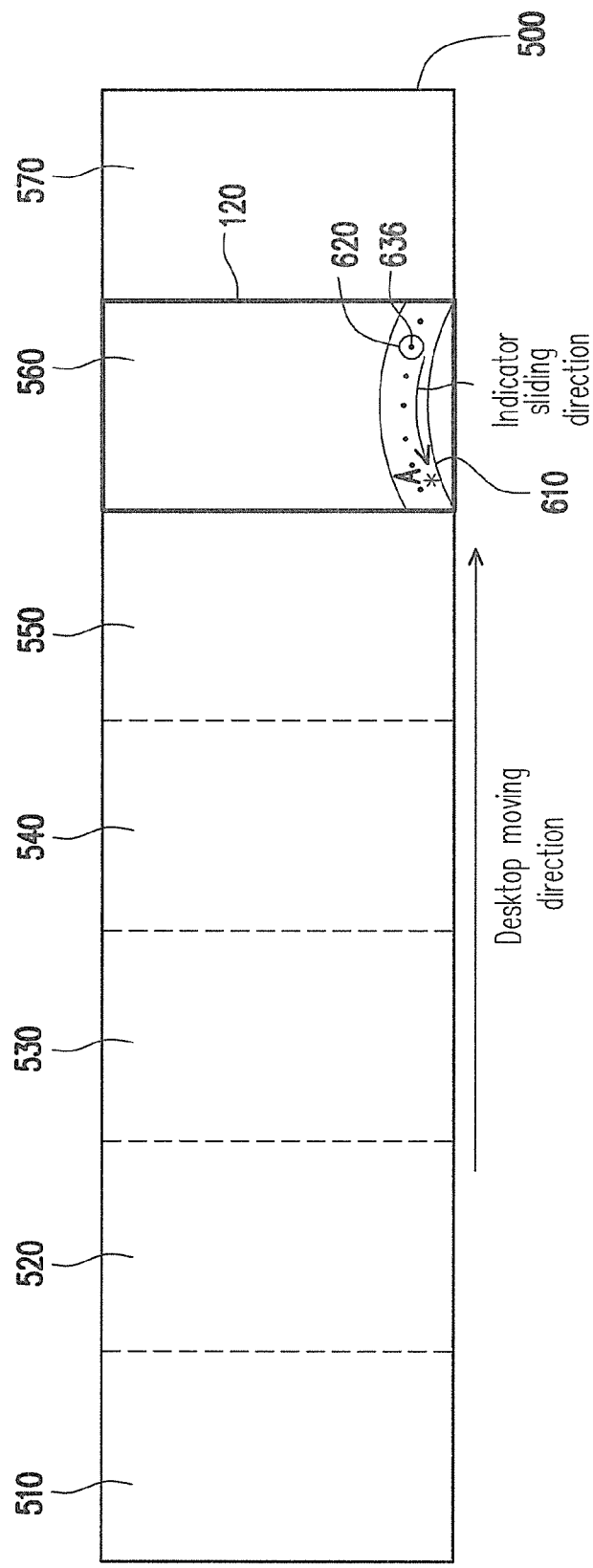
Figure 9C:
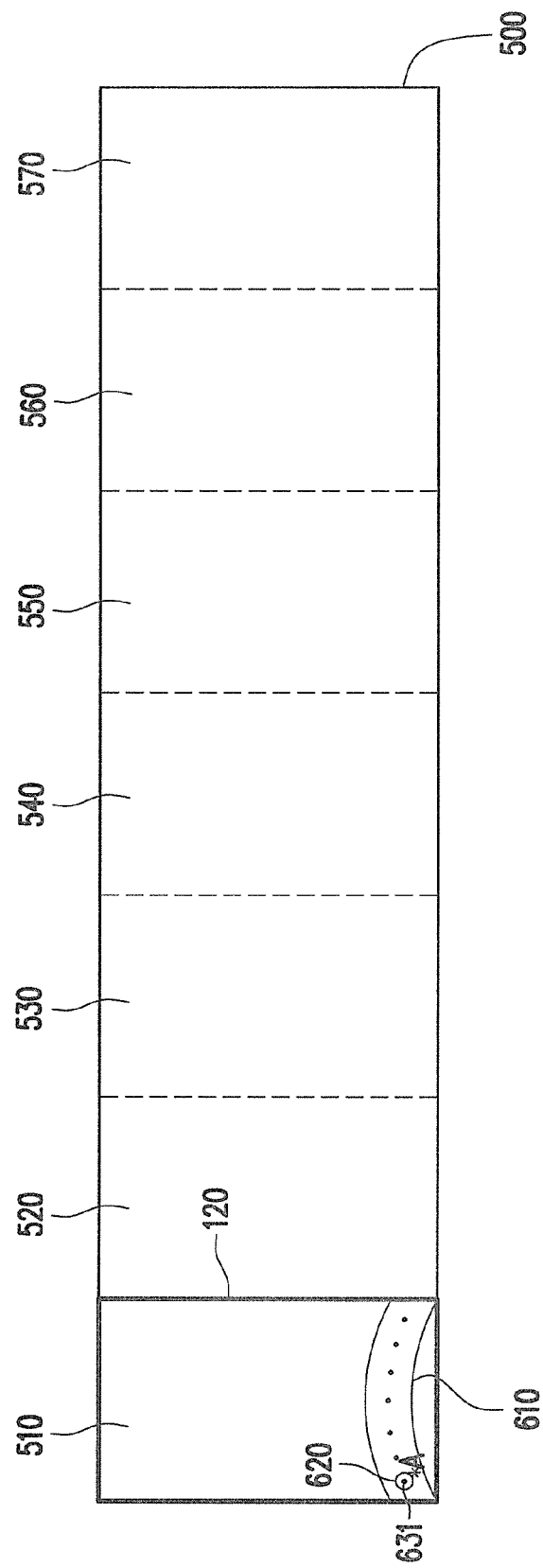

FIGS. 9A, 9B, and 9C illustrate the content displayed in the touch screen 120 according to another embodiment of the desktop viewing method in the present invention. As shown in FIG. 9A, before the user performs any operation, the touch screen 120 displays the area 560 of the desktop 500. Meanwhile, the indicator 620 of the navigation bar 610 points to the index 636 corresponding to the area 560. Thus, the user may get to know the relative position between the area currently displayed by the touch screen 120 (i.e., the area 560) and the other areas of the desktop 500 according to the position of the indicator 620 on the navigation bar 610.

Then, as shown in FIG. 9B, when the user touches a position A on the navigation bar with his/her finger (or a stylus), the indicator 620 is moved leftwards on the navigation bar 610, and the desktop 500 is moved rightwards.

Finally, as shown in FIG. 9C, because the clicked position A is closest to the index 631 on the navigation bar 610, the processing module 130 moves the indicator 620 to point to the index 631 and the desktop 500 to completely display the area 510 corresponding to the index 631 in the touch screen 120.

Thereby, the user may control the touch screen 120 to directly display a desired area of the desktop by clicking at the index corresponding to the desired area on the navigation bar 610. In other words, even though the area to be viewed by the user is not adjacent to the area currently displayed in the touch screen 120 on the desktop (i.e., the two areas are separated by one or more areas on the desktop), the user may still control the touch screen 120 to directly switch from the currently displayed area to the desired area by clicking at the index on the navigation bar. Thereby, viewing the desktop is made more efficient.

In the embodiment described above, the processing module 130 further calculates a stop time during which the desktop and the indicator are never moved. When the stop time reaches a predetermined value (for example, 3 seconds), the processing module 130 hides the navigation bar. For example, the processing module 130 displays a tool bar in the touch screen 120 to cover the navigation bar or slides the navigation bar out of the touch screen 120 to hide the navigation bar. The processing module 130 displays the navigation bar in the touch screen 120 again when the touch screen 120 detects a sliding operation performed by the user (the sliding operation may take place at a specific position or any position on the touch screen 120). For example, the processing module 130 removes the tool bar covering the navigation bar or slides the navigation bar back into the touch screen 120 to display the navigation bar again.

Figure 3:
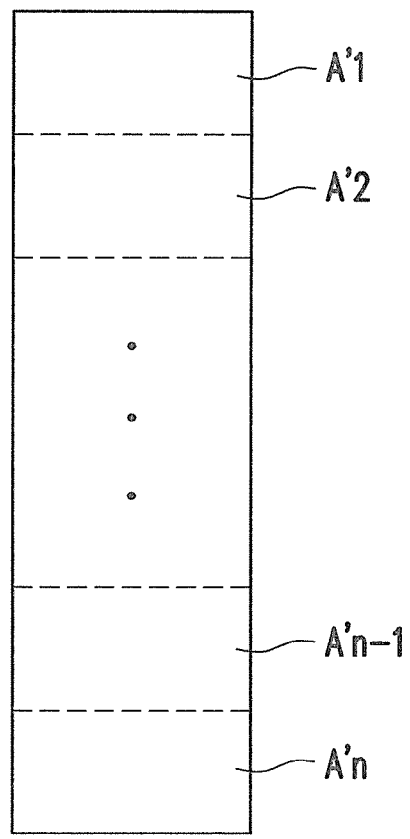

Even though the present invention is described above with a desktop equally divided into a plurality of areas horizontally, in another embodiment of the present invention, the desktop module 110 may also vertically divide the desktop into a plurality of areas (as the desktop 300 illustrated in FIG. 3). The touch screen 120 displays any one of the areas and a navigation bar. The navigation bar is a vertical scroll bar and has an indicator and a plurality of indexes respectively corresponding to the areas of the desktop. The navigation bar is displayed at a vertical edge (for example, the left edge or the right edge) of the touch screen 120. The indexes are vertically arranged on the vertical scroll bar in an order of the corresponding areas on the desktop. When the user is about to view a different area of the desktop, the user may slide the indicator on the navigation bar up and down with his/her finger (or a stylus). In this case, the processing module 130 moves the desktop and the indicator according to the sliding operation. When the user is about to view a specific area of the desktop, the user clicks the index corresponding to the specific area on the navigation bar, and the processing module 130 directly slides the desktop to display the specific area in the touch screen. The detailed operation for the processing module 130 to display the specific area is the same as or similar to that described in foregoing embodiment therefore will not be described herein.

The present invention further provides a computer-readable medium storing a plurality of program instructions (for example, configuration program instructions or deployment program instructions). These program instructions can be loaded into an electronic device and executed by the same to accomplish the steps in the desktop viewing method described above and allow the electronic device to accomplish the functions described in foregoing embodiment. The computer-readable medium may be any data storage device (for example, a read only memory, a random access memory, a tape, a floppy disk, a hard disk, a CD, or a transmission medium, etc) or a database accessible from a network. However, the type of the computer-readable medium is not limited in the present invention.

To be specific, a user may obtain the computer-readable medium and load the program instructions therein into an electronic device, so as to execute the desktop viewing method described in foregoing embodiment in the electronic device. Besides, in a client-server or a peer-to-peer (P2P) network, the user may download the program instructions in the computer-readable medium into the electronic device through the network (for example, a wired network or a wireless network). After executing the program instructions, the electronic device displays a navigation bar such that the user may instantly view every area of the desktop.

As described above, the present invention provides an electronic device, a desktop viewing method, and a computer-readable medium. When the user operates the electronic device and the electronic device has a large desktop divided into a plurality of continuous areas, the user may instantly view each area of the desktop and switch to a desired area of the desktop through a navigation bar. In addition, the indicator and indexes on the navigation bar show the user about the relative position between the area currently displayed in the touch screen and the other areas of the desktop. Thereby, the user may view the content of the desktop conveniently, and the efficiency in operating the electronic device is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A desktop viewing method, for viewing a desktop of an electronic device having a touch screen, wherein the desktop is divided into n areas, n is a positive integer greater than 1, and one of the n areas is displayed on the touch screen, the method comprising:
displaying a navigation bar on the touch screen, wherein the navigation bar comprises an indicator and n indexes, each one of the n indexes corresponds to one of the n areas of the desktop, and the indicator points to the index corresponding to the area currently displayed on the touch screen;
detecting a sliding operation on the navigation bar;
moving the desktop and the indicator according to the sliding operation;
selecting the index closest to the indicator from the n indexes as a target index after the sliding operation terminates at the moment the indicator is moved to a position between two indexes adjacent to each other; and
displaying a target area corresponding to the target index on the touch screen.

2. The method according to claim 1 further comprising:
detecting a clicking operation on the navigation bar;
selecting a specific index from the n indexes according to the clicking operation;
controlling the indicator to point to the specific index; and
displaying a specific area corresponding to the specific index on the touch screen.

3. The method according to claim 2, wherein the step of selecting the specific index from the n indexes according to the clicking operation further comprises:
selecting the index closest to a clicked position of the clicking operation on the navigation bar from the n indexes as the specific index.

4. The method according to claim 1 further comprising:
calculating a stop time during which the desktop and the indicator are never moved; and
hiding the navigation bar when the stop time reaches a predetermined value.

5. The method according to claim 4, wherein the step of hiding the navigation bar comprises:
displaying a tool bar to cover the navigation bar.

6. The method according to claim 4, wherein after the step of hiding the navigation bar, the method further comprises:
displaying the navigation bar when the sliding operation on the touch screen is detected.

7. The method according to claim 1, wherein the desktop is equally divided into the n areas horizontally, the navigation bar is a horizontal scroll bar, and the n indexes are horizontally arranged on the horizontal scroll bar in an order of the corresponding n areas on the desktop.

8. The method according to claim 7, wherein the step of displaying the navigation bar on the touch screen comprises:
displaying the horizontal scroll bar at a horizontal edge of the touch screen.

9. The method according to claim 1, wherein the desktop is equally divided into the n areas vertically, the navigation bar is a vertical scroll bar, and the n indexes are vertically arranged on the vertical scroll bar in an order of the corresponding n areas on the desktop.

10. The method according to claim 9, wherein the step of displaying the navigation bar on the touch screen comprises:
displaying the vertical scroll bar at a vertical edge of the touch screen.

11. The method according to claim 1, wherein a size of each of the n areas of the desktop tallies with a size of the touch screen.

12. An electronic device, comprising:
a desktop module, for providing a desktop of the electronic device, wherein the desktop is divided into n areas, and n is a positive integer greater than 1;
a touch screen, for displaying one of the n areas and a navigation bar, wherein the navigation bar comprises an indicator and n indexes, each one of the n indexes corresponds to one of the n areas of the desktop, and the indicator points to the index corresponding to the area currently displayed on the touch screen; and a processing module, coupled to the desktop module and the touch screen, wherein when the touch screen detects a sliding operation on the navigation bar, the processing module moves the desktop and the indicator according to the sliding operation, and after the sliding operation terminates at the moment the indicator is moved to a position between two indexes adjacent to each other, the processing module selects the index closest to the indicator from the n indexes as a target index, and displays a target area corresponding to the target index on the touch screen.

13. The electronic device according to claim 12, wherein when the touch screen detects a clicking operation on the navigation bar, the processing module selects a specific index from the n indexes according to the clicking operation, controls the indicator to point to the specific index, and displays a specific area corresponding to the specific index on the touch screen.

14. The electronic device according to claim 13, wherein the processing module selects the index closest to a clicked position of the clicking operation on the navigation bar from the n indexes as the specific index.

15. The electronic device according to claim 12, wherein the processing module calculates a stop time during which the desktop and the indicator are never moved, and when the stop time reaches a predetermined value, the processing module hides the navigation bar.

16. The electronic device according to claim 15, wherein the processing module displays a tool bar to cover the navigation bar when the processing module hides the navigation bar.

17. The electronic device according to claim 15, wherein after the navigation bar is hidden, the processing module displays the navigation bar when the touch screen detects the sliding operation on the touch screen.

18. The electronic device according to claim 12, wherein the desktop module equally divides the desktop into the n areas horizontally, the navigation bar is a horizontal scroll bar, and the n indexes are horizontally arranged on the horizontal scroll bar in an order of the corresponding n areas on the desktop.

19. The electronic device according to claim 18, wherein the processing module controls the horizontal scroll bar to be displayed at a horizontal edge of the touch screen.

20. The electronic device according to claim 12, wherein the desktop module equally divides the desktop into the n areas vertically, the navigation bar is a vertical scroll bar, and the n indexes are vertically arranged on the vertical scroll bar in an order of the corresponding n areas on the desktop.

21. The electronic device according to claim 20, wherein the processing module controls the vertical scroll bar to be displayed at a vertical edge of the touch screen.

22. The electronic device according to claim 12, wherein a size of each of the n areas of the desktop tallies with a size of the touch screen.

23. A non-transitory computer-readable medium, storing a plurality of program instructions for being loaded into an electronic device, wherein the electronic device has a desktop divided into n areas, n is a positive integer greater than 1, one of the n areas is displayed on a touch screen of the electronic device, and the program instructions execute following operations after the program instructions are loaded into the electronic device:

displaying a navigation bar on the touch screen, wherein the navigation bar comprises an indicator and n indexes, each one of the n indexes one of the n areas of the desktop, and the indicator points to the index corresponding to the area currently displayed on the touch screen;

detecting a sliding operation on the navigation bar;

moving the desktop and the indicator according to the sliding operation;

selecting the index closest to the indicator from the n indexes as a target index after the sliding operation terminates at the moment the indicator is moved to a position between two indexes adjacent to each other; and displaying a target area corresponding to the target index on the touch screen.

24. The non-transitory computer-readable medium according to claim 23, wherein the program instructions further detect a clicking operation on the navigation bar, select a specific index from the n indexes according to the clicking operation, control the indicator to point to the specific index, and display a specific area corresponding to the specific index on the touch screen.

25. The non-transitory computer-readable medium according to claim 24, wherein when the program instructions select the specific index from the n indexes according to the clicking operation, the program instructions select the index closest to a clicked position of the clicking operation on the navigation bar from the n indexes as the specific index.

26. The non-transitory computer-readable medium according to claim 23, wherein the program instructions further calculate a stop time during which the desktop and the indicator are never moved and hide the navigation bar when the stop time reaches a predetermined value.

27. The non-transitory computer-readable medium according to claim 26, wherein the program instructions display a tool bar to cover the navigation bar when the program instructions hide the navigation bar.

28. The non-transitory computer-readable medium according to claim 26, wherein after the program instructions hide the navigation bar, the program instructions display the navigation bar when the program instructions detect the sliding operation on the touch screen.

29. The non-transitory computer-readable medium according to claim 23, wherein the desktop is equally divided into the n areas horizontally, the navigation bar is a horizontal scroll bar, and the n indexes are horizontally arranged on the horizontal scroll bar in an order of the corresponding n areas on the desktop.

30. The non-transitory computer-readable medium according to claim 29, wherein when the program instructions display the navigation bar on the touch screen, the program instructions display the horizontal scroll bar at a horizontal edge of the touch screen.

31. The non-transitory computer-readable medium according to claim 23, wherein the desktop is equally divided into the n areas vertically, the navigation bar is a vertical scroll bar, and the n indexes are vertically arranged on the vertical scroll bar in an order of the corresponding n areas on the desktop.

32. The non-transitory computer-readable medium according to claim 31, wherein when the program instructions display the navigation bar on the touch screen, the program instructions display the vertical scroll bar at a vertical edge of the touch screen.

33. The non-transitory computer-readable medium according to claim 23, wherein a size of each of the n areas of the desktop tallies with a size of the touch screen.

* * * * *